March 15, 1960  T. H. THOMPSON  2,928,507
FRICTION AND FLUID SHOCK ABSORBER
Filed July 9, 1956  2 Sheets-Sheet 1
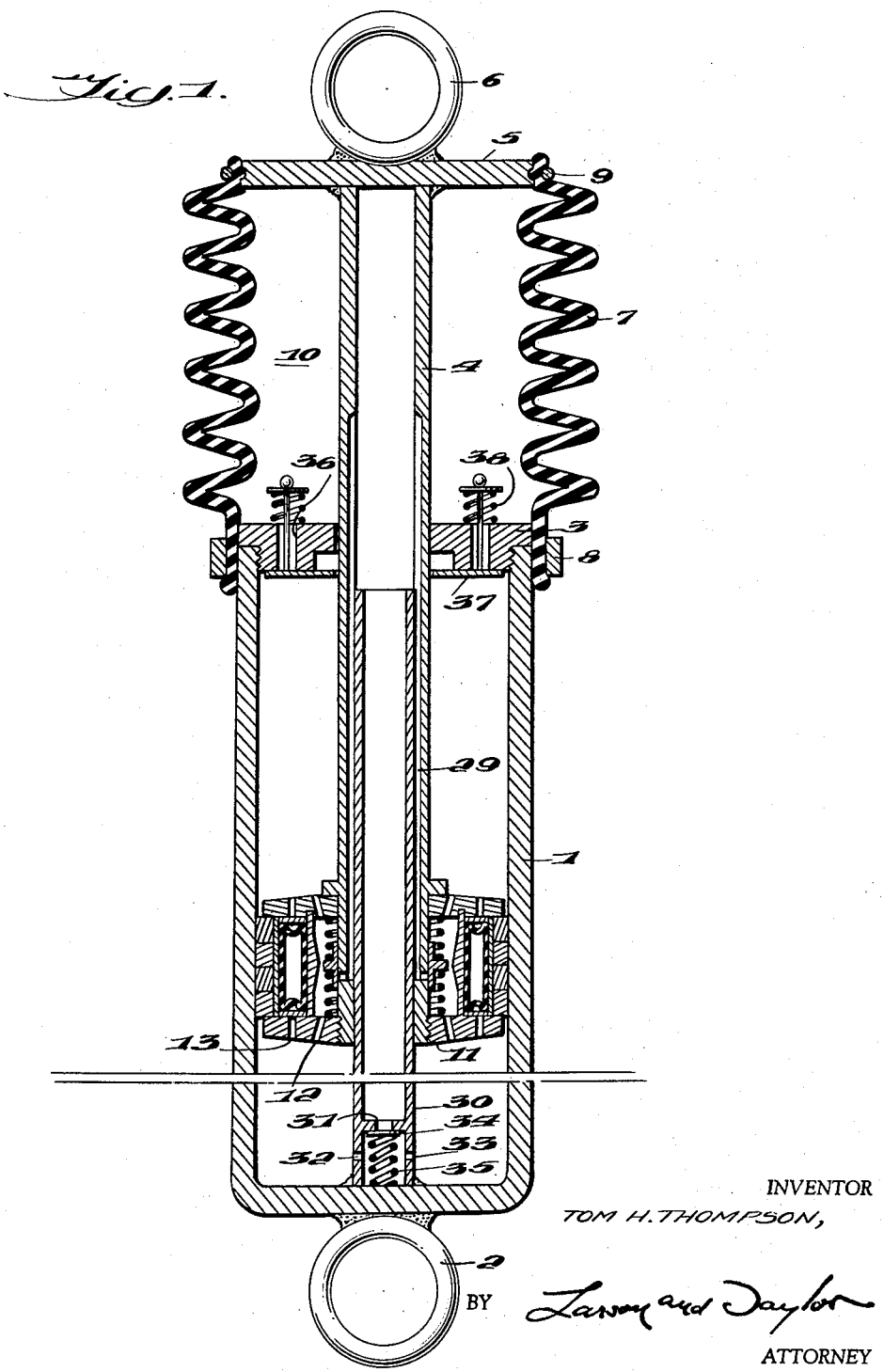
INVENTOR
TOM H. THOMPSON,
BY Larson and Taylor
ATTORNEY

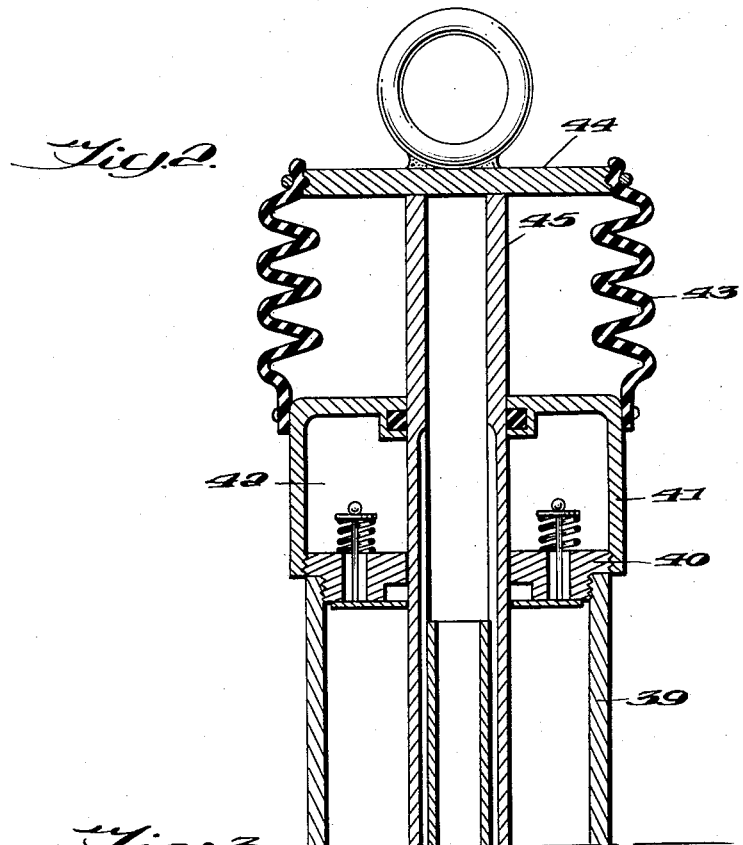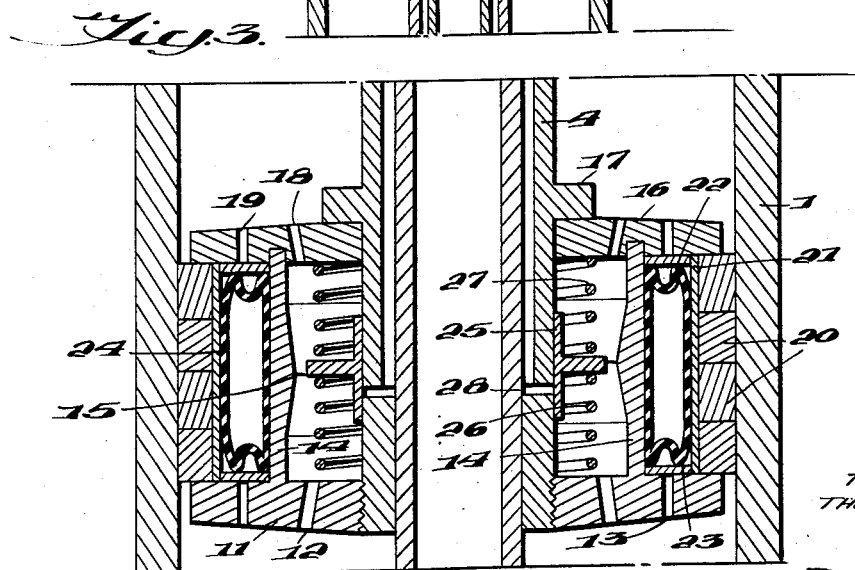

United States Patent Office 2,928,507
Patented Mar. 15, 1960

2,928,507

FRICTION AND FLUID SHOCK ABSORBER

Tom H. Thompson, Daytona Beach, Fla., assignor to Sabre Research Corporation, Daytona Beach, Fla., a corporation of Florida Application July 9, 1956, Serial No. 596,699

4 Claims. (Cl. 188—86)

This invenion relates to a shock absorber and more particularly to a shock absorber of the hydraulic type which is adapted to maintain complete control during all conditions of use.

Heretofore, shock absorbers have been developed which are adequate under normal conditions of use. Such shock absorbers generally comprise a fluid-filled cylinder with a piston and piston rod slidable therein. Apertures are provided in the piston so that the fluid can pass therethrough upon the application of a force to either the cylinder or piston to provide a cushioning effect. Such devices were quite adequate under ordinary circumstances. When subjected to a number of successive shocks, prior art shock absorbers, however, are likely to give little or no control at the instant when the piston reaches the limit of movement in one direction and prior to the time pressure has been built up within the cylinder opposing piston movement in the opposite direction. At this so-called "neutral" point axle vibration is likely to occur. Furthermore, prior art shock absorbers afforded the same resistance to piston movement irrespective of the degree of shock. Even the shock absorbers with additional valves in the piston head which open upon increased pressure do not afford sufficient flexibility. The present invention provides damping at all times during piston movement thereby avoiding the disadvantages attendant with a neutral point. Furthermore, the present invention provides a degree of flexibility in the amount of cushioning afforded by large and small shocks.

The present invention resolves the above difficulties in a completely novel manner. According to the present invention, there is provided a fluid-filled cylinder with a piston slidable therein. This piston is provided with aperture means which are variable in size dependent upon the magnitude of the shock so that under extreme shock conditions a larger orifice is present in the piston than with a shock of lesser degree. In addition, there are provided friction elements on the piston which are engageable with the inner wall of the cylinder to provide a frictional drag when successive shocks are rapidly applied. This frictional means serves to insure adequate control at a time when ordinary shock absorbers offer no resistance.

A primary object of the present invention is to provide a shock absorber which will maintain adequate control under any operating conditions.

It is a further object of the present invention to provide a shock absorber in which a combination of hydraulic and frictional means is utilized to provide for the necessary control.

Other objects and many of the attendant advantages of the present invention will become apparent upon consideration of the following detailed specification taken in conection with the accompanying drawings wherein:

Fig. 1 is a longitudinal cross-sectional view of one form of the present invention;

Fig. 2 is a partial longitudinal cross-sectional view showing a modification of the invention; and Fig. 3 is an expanded cross-sectional view of the piston shown in Fig. 1.

Referring to Fig. 1 there is shown a cylindrical casing 1 having a ring member 2 welded thereto to provide connecting means for the shock absorber. A top plate 3 is screw threaded within the cylinder 1 and has a central aperture therein for passage of the piston rod 4. Piston rod 4 is secured to head plate 5 to the outer face of which is attached a ring 6. A bellows 7 securely attached to the cylinder 1 as by means of retaining ring 8 and to head plate 5 by means of ring 9 forms a chamber 10 for a purpose which will become apparent hereinafter.

Referring to Fig. 3 it can be seen that secured to the end of the piston rod 4 is a plate 11 which has inner and outer rings of apertures 12 and 13 respectively. Formed integrally with the upper face of plate 11 and extending upwardly therefrom is a ring-shaped member 14 having an inner wall which is centrally enlarged as at 15 and formed with sloping sides as shown. There is provided an upper plate 16 which is formed with a recess to receive the upper edge of member 14 and which is retained in place by a flange 17 formed on the piston rod 4. The plate 16 is provided with inner and outer rings of apertures 18 and 19 similar to the apertures 12 and 13 previously described.

Supported between the plates 11 and 16 is a plurality of friction rings 20 which are split so as to be expansible by internal pressure against the inner surface of cylindrical wall 1. A ring-shaped strap 21 which is also split rests against the inner face of all of the friction rings 20 to assure equalization of the pressure around the entire periphery of the rings. Ring shaped elements 22 and 23 are slidably received within the chamber between walls 14 and 21 and these elements form valve members as will be described more fully hereinafter. Also disposed within the chamber is a flexible donut-shaped liner 24 which is filled with air and which urges the piston members 22 and 23 into sealing engagement with the apertures 19 and 13 respectively.

Slidably disposed on piston rod 4 is a valve element 25 having a peripheral flange as shown to form a seat for springs 26 and 27 which act between this flange and the inner walls of members 11 and 16 respectively. The member 25 forms a metering valve and is adapted when moved to uncover a port 28 in the piston rod 4. This port connects through undercut portion 29 with the interior of the piston rod.

Fixedly secured to the end of cylinder 1 is a tubular element 30 (Fig. 1) which extends upwardly through an aperture in the piston. This tubular element is provided with a valve comprising ports 31, 32 and 33 and a valve seat 34 normally urged to close port 31 by means of spring 35.

In the Fig. 1 embodiment it can be seen that the cylinder head 3 is provided with a plurality of ports 36 and a valve element 37 normally closes these ports by virtue of the action of springs 38.

In the Fig. 2 embodiment the cylinder 39 is provided with a cylinder head 40 having a valve arrangement similar to that described with reference to the Fig. 1 embodiment. There is provided a cap-shaped member 41 which is screw threaded on the outer periphery of the head 40 to form a chamber 42. A bellows 43 forms a chamber between the cap 41 and end plate 44 supporting the piston rod 45.

The device operates in the following manner. Under ordinary circumstances, that is, upon the application of slight pressure under normal shock conditions, the fluid will pass through the ports 12 in the plate 11. Fluid received within the inner chamber will pass upwardly past the restricted orifice formed by slide metering valve 25 and the protruding portion 15 of inner wall 14. The fluid will pass upwardly and out through ports 18. The pressure of the fluid in its upwardly flow through the chamber causes slight upward movement of the slide metering valve 25 and this movement increases the orifice size between the valve and protrusion 15. Under normal conditions there is insufficient pressure developed in the fluid to open the piston 23 to admit fluid to the outer chamber, between rings 20 and member 14.

When the slide metering valve moves upward it uncovers ports 28 to permit fluid to pass upwardly through undercut portion 29 into tube 30. Fluid will pass into this tube to compensate for the decreased volume within cylinder 1 due to the entry of a greater portion of piston rod 4. As the piston moves in the opposite direction to decrease the portion of piston rod within the cylinder, the pressure differential between the interior of tube 30 and cylinder 1 increases and thereby valve 34 opens to admit additional fluid within cylinder 1.

Upon the application of a number of successive shocks the pressure of the fluid against the piston increases to such an extent that the piston 23 will open on a down stroke and the piston 22 will open on an up stroke. The fluid admitted into the outer annular chamber will cause the liner 24 to be compressed against the strap 21 to force the rings 20 outwardly into engagement with the cylinder wall. Thus, a frictional drag is produced and this friction provides control at the neutral or end point of piston travel when ordinary shock absorbers offer no control. As pointed out above, the pistons 22 and 23 will alternately open and close during successive shocks to maintain pressure within the outer annular chamber. Upon return to normal conditions the fluid within the outer chamber will leak out around the strap 21 and rings 20.

The chamber 10 forms a supply reservoir for fluid in the cylinder so that the cylinder is kept filled at all times. The bellows 7 forms an expansible chamber for this reservoir and also provides a dust shield for the moving parts of the shock absorber. The provision of such a bellows eliminates the necessity for a high pressure oil seal of any type between the piston rod and the cylinder.

In the Fig. 2 embodiment the cap 41 provides an oil reservoir and the bellows 43 serves as a dust shield and obviates the necessity for a high pressure oil seal between cap 41 and piston rod 45.

The pistons 22 and 23 are ring shaped elements which are urged into sealing engagement with the apertures 19 and 13 respectively by the flexible liner 24, which is air-filled. Rings 20 are split so that they are adapted to be expansible against the inner wall of cylinder 1 by means of internal pressure. This internal pressure is exerted by a split strap 21 which extends around the inner periphery of the friction rings. When fluid pressure exerts sufficient force against one of the pistons 22 or 23, the valves will open and therefore increase the pressure against the innerface of strap 21. This increased pressure will in turn be exerted against the friction blocks to increase the frictional resistance of these members against the inner wall of the cylinder 1. Just prior to the piston reaching its end point of travel a maximum fluid pressure is reached and it is this maximum fluid pressure which causes the piston 22 or 23 to open and increase the pressure against the friction rings 20 so that when the end point is reached and fluid pressure is zero there will be some control by reason of the increased frictional resistance. Under normal operating conditions the fluid within the outer chamber will leak out around the strap 21 and rings 20. When piston 20 moves downwardly very slowly so that the valve 25 remains closed, the system will permit sufficient leakage around the friction rings and valves so as to compensate for the slight increase in volume of the piston rod. It is only on the application of a sudden large increase in pressure that the valve 25 moves to such an extent to open the port 28 to give an additional relief means.

It can be readily appreciated that a shock absorber has been provided which is readily adaptable to varying conditions and which provides control at all times. A variable orifice insures a degree of flexibility in the amount of cushioning provided. Furthermore, a mechanical means is provided to give control at a time when ordinary shock absorbers completely fail. The unit is completely enclosed and is relatively dust free.

The present invention may be modified easily to suit varying requirements. By varying the tension of the springs 26 and 27 retaining the metering valve 25 in place, various degrees of control can be effected. A more flexible spring action will give a greater degree of movement of the piston for a given increase in pressure. Furthermore, a varying control can be effected by varying the slope of the inner wall of member 14. It is further apparent that the inner wall of member 14 could be flat and the sloping wall formed on piston rod 4.

Obviously many modifications and variations of the present invention are possible in the light of the above teachings. What is claimed as new and desired to be secured by Letters Patent is:

1. In a fluid type shock absorber, an outer cylindrical body, a piston rod, a piston rigidly attached to said piston rod and slidable within said body, fluid contained above and below said piston, a first means comprising a variable area orifice disposed in said piston for creating variable fluid resistance to movement of said piston relative to said body, a second means for creating mechanical friction resistance to movement of said piston relative to said body, means associated with said second means for varying the degree of friction resistance in response to variation in the fluid pressure, said second named means comprising a chamber within said piston, at least one inlet and outlet for said chamber, the outer wall of said chamber comprising friction blocks cylindrically aranged adjacent to said outer cylindrical body, and said means associated with said second means comprising a doughnut shaped flexible tubular member contained between said blocks and an inner surface of said chamber, whereby compression of said tubular member by fluid pressure causes said friction blocks to be pressed against said body.

2. In a fluid-type shock absorber as claimed in claim 1, and further comprising a split cylindrical ring interposed between said flexible tubular member and said friction blocks, to obtain an equally dispersed pressure against all of said blocks.

3. In a fluid-type shock absorber as claimed in claim 2, and further comprising piston members in said inlet and outlet, said piston members momentarily retaining extreme pressure within said chamber.

4. In a fluid-type shock absorber as claimed in claim 3, wherein said piston members are flap-type.

References Cited in the file of this patent

UNITED STATES PATENTS

| | | |
|---|---|---|
| 1,474,498 | Swanstrom | Nov. 20, 1923 |
| 2,352,351 | Thornhill | June 27, 1944 |
| 2,458,157 | Funkhouser | Jan. 4, 1949 |

FOREIGN PATENTS

| | | |
|---|---|---|
| 1,024,801 | France | Jan. 10, 1953 |
| 1,081,439 | France | June 9, 1954 |
| 461,577 | Great Britain | Feb. 19, 1937 |